(12) United States Patent
Jang et al.

(10) Patent No.: US 11,370,489 B2
(45) Date of Patent: Jun. 28, 2022

(54) VEHICLE AND METHOD FOR STEERING AVOIDANCE CONTROL

(71) Applicants: Hyundai Motor Company, Seoul (KR); Kia Motors Corporation, Seoul (KR)

(72) Inventors: Yonjun Jang, Changwon-si (KR); Hyunsu Kim, Suwon-si (KR); Tae Young Lee, Yongin-si (KR); Jonghyeok Park, Seosan-si (KR); Hyungmin Ko, Suwon-si (KR); Sungmin Ji, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 245 days.

(21) Appl. No.: 16/686,648

(22) Filed: Nov. 18, 2019

(65) Prior Publication Data
US 2020/0406970 A1  Dec. 31, 2020

(30) Foreign Application Priority Data
Jun. 26, 2019  (KR) .................. 10-2019-0076367

(51) Int. Cl.
*B62D 15/02*  (2006.01)
*B60W 30/09*  (2012.01)
*B60T 7/12*  (2006.01)

(52) U.S. Cl.
CPC ........... *B62D 15/0265* (2013.01); *B60T 7/12* (2013.01); *B60W 30/09* (2013.01); *B60T 2210/32* (2013.01)

(58) Field of Classification Search
None
See application file for complete search history.

(56) References Cited

U.S. PATENT DOCUMENTS

| | | | |
|---|---|---|---|
| 9,944,317 B2* | 4/2018 | Lee | B62D 15/0265 |
| 9,977,430 B2* | 5/2018 | Shalev-Shwartz | G06N 3/006 |
| 10,471,954 B2* | 11/2019 | Saiki | B60W 30/09 |
| 2020/0089245 A1* | 3/2020 | Yadmellat | B60W 60/0011 |
| 2020/0341474 A1* | 10/2020 | Zuo | B60W 60/0011 |

* cited by examiner

*Primary Examiner* — Todd Melton
(74) *Attorney, Agent, or Firm* — Morgan, Lewis & Bockius LLP

(57) ABSTRACT

A vehicle includes: a sensor configured to detect an obstacle of a front side of the vehicle to obtain at least one of position information or speed information of the obstacle; a lane detector configured to detect a lane on which the vehicle is located; and a controller configured to calculate a first lateral movement distance for the vehicle to avoid an obstacle through steering, to determine a steering-based avoidance path for the obstacle based on the first lateral movement distance, to determine whether to depart the lane on the steering-based avoidance path, and to control the vehicle to perform steering avoidance control when the vehicle does not depart the lane.

12 Claims, 9 Drawing Sheets

VEHICLE AND METHOD FOR STEERING AVOIDANCE CONTROL

CROSS-REFERENCE TO RELATED APPLICATION(S)

This application is based on and claims priority to Korean Patent Application No. 10-2019-0076367, filed on Jun. 26, 2019 in the Korean Intellectual Property Office, the disclosure of which is incorporated by reference in its entirety.

TECHNICAL FIELD

The present disclosure relates to a vehicle and a method of controlling the vehicle, and more particularly, to a technology for avoiding collision with a forward obstacle through steering control while the vehicle is driving.

BACKGROUND

Generally, vehicles are driven on roads or tracks to transport people or goods to destinations. Vehicles are able to move to various locations on one or more wheels mounted onto the frame of the vehicle. Such vehicles may be classified into three- or four-wheel vehicles, a two-wheel vehicle such as a motorcycle, construction machinery, bicycles, trains traveling along rails on tracks, and the like.

In modern society, vehicles are the most common transportation means, and people using the vehicles have been increasing. With the development of automotive technology, there are advantages of traveling long distances, but problems also often arise in traffic conditions worsen and traffic jams increase where population densities are high.

To relieve burdens and increase convenience of a driver, recent studies regarding vehicles equipped with an Advanced Driver Assist System (ADAS) that actively provides information regarding a state of the vehicle, a state of the driver, and surrounding conditions are actively ongoing.

Examples of the ADAS equipped within the vehicle include Smart Cruise Control System, Lane Keeping Assist System, Lane Following Assist and Lane Departure Warning System, Forward Collision Avoidance (FCA), and Autonomous Emergency Brake (AEB). The systems are systems that avoid collision through emergency braking by determining a risk of collision with an opposing vehicle or a crossover vehicle while the vehicle is being driven, control the vehicle to drive while maintaining a distance from a preceding vehicle, or assist the vehicle not to depart from a driving lane.

The FCA is a system that assists collision avoidance through braking in the case of a risk of collision with a forward obstacle while the vehicle is driving. In this case, a braking distance increases as a driving speed of the vehicle increases. Therefore, when the braking distance is not sufficiently secured, the collision should not be avoided through braking in the case of the risk of collision with the forward obstacle and the collision should be avoided through steering control.

Recently, when the vehicle avoids collision with the forward obstacle through the steering control, the importance of a technology that can avoid collision without departing the driving lane is increasing.

SUMMARY

An aspect of the present disclosure is to provide a vehicle for performing steering control without departing a lane in which the vehicle is driving when collision with a forward obstacle is avoided through steering while the vehicle is driving, and a method of controlling the vehicle.

Additional aspects of the disclosure will be set forth in part in the description which follows and, in part, will be obvious from the description, or may be learned by practice of the disclosure.

In accordance with an aspect of the present disclosure, a vehicle includes: a sensor configured to detect an obstacle of a front side of the vehicle to obtain at least one of position information or speed information of the obstacle; a lane detector configured to detect a lane on which the vehicle is located; and a controller configured to calculate a first lateral movement distance for the vehicle to avoid a forward obstacle through steering, to determine a steering-based avoidance path for the obstacle based on the first lateral movement distance, to determine whether to depart the lane on the determined steering-based avoidance path, and to control the vehicle to perform steering avoidance control when the vehicle does not depart the lane.

The controller may calculate the lateral movement distance for the vehicle to avoid steering to a left side of the obstacle and the lateral movement distance for the vehicle to avoid steering to a right side of the obstacle, based on the position information of the obstacle, width information of the vehicle, and width information of the obstacle.

The controller may determine a path having a short lateral movement distance among the lateral movement distance of the determined left steering-based avoidance path and the lateral movement distance of the determined right steering-based avoidance path as the steering-based avoidance path for the obstacle.

After the vehicle avoids the forward obstacle through steering, the controller may calculate the lateral movement distance for the vehicle to return to a driving direction before steering avoidance starts through steering in a direction opposite to a steering direction.

The controller may calculate a total lateral movement distance for the vehicle to avoid the forward obstacle through steering by summing the lateral movement distance for the vehicle to avoid steering the forward obstacle and the lateral movement distance for the vehicle to return to the driving direction after the steering avoidance starts.

The controller may determine a distance from the vehicle to the lane based on lane information detected by the lane detector, and to compare the calculated total lateral movement distance with the distance from the vehicle to the lane to determine whether the vehicle departs the lane on the steering-based avoidance path of the vehicle.

When the calculated total lateral movement distance is shorter than the distance from the vehicle to the lane, the controller may determine that the vehicle does not depart the detected lane on the steering-based avoidance path.

When the calculated total lateral movement distance is longer than the distance from the vehicle to the lane, the controller may determine that the vehicle departs the detected lane on the steering-based avoidance path.

When it is determined that the vehicle departs the detected lane on the steering-based avoidance path, the controller may control the vehicle not to perform the steering avoidance control and control braking of the vehicle.

In accordance with another aspect of the present disclosure, a method of controlling a vehicle includes: detecting, by a sensor, an obstacle of a front side of the vehicle to obtain at least one of position information or speed information of the obstacle; calculating, by a controller, a first lateral movement distance for the vehicle to avoid the obstacle through steering; determining, by the controller, a steering-based avoidance path for the obstacle based on the first lateral movement distance; detecting, by a lane detector, a lane on which the vehicle is located; determining, by the controller, whether to depart the lane on the steering-based avoidance path; and controlling, by the controller, the vehicle to perform steering avoidance control when the vehicle does not depart the lane.

The calculating of the controller, a lateral movement distance may include calculating the lateral movement distance for the vehicle to avoid steering to a left side of the obstacle and the lateral movement distance for the vehicle to avoid steering to a right side of the obstacle, based on the position information of the obstacle, width information of the vehicle, and width information of the obstacle.

The determining of the steering-based avoidance path for the obstacle may include determining a path having a short lateral movement distance among the lateral movement distance of the determined left steering-based avoidance path and the lateral movement distance of the determined right steering-based avoidance path as the steering-based avoidance path for the obstacle.

The method may further include, after the vehicle avoids the forward obstacle through steering, calculating, by the controller, the lateral movement distance for the vehicle to return to a driving direction before steering avoidance starts through steering in a direction opposite to a steering direction.

The method may further include calculating, by the controller, a total lateral movement distance for the vehicle to avoid the forward obstacle through steering by summing the lateral movement distance for the vehicle to avoid steering the forward obstacle and the lateral movement distance for the vehicle to return to the driving direction after the steering avoidance starts.

The method may further include determining, by the controller, a distance from the vehicle to the lane based on lane information detected by the lane detector. The determining of whether the vehicle departs the lane may include determining whether the vehicle departs the lane on the steering-based avoidance path of the vehicle by comparing the calculated total lateral movement distance with the distance from the vehicle to the lane.

The determining of whether the vehicle departs the lane may include determining that the vehicle does not depart the detected lane on the steering-based avoidance path when the calculated total lateral movement distance is shorter than the distance from the vehicle to the lane.

The determining of whether the vehicle departs the lane may include determining that the vehicle departs the detected lane on the steering-based avoidance path when the calculated total lateral movement distance is longer than the distance from the vehicle to the lane.

The method may further include, when it is determined that the vehicle departs the detected lane on the steering-based avoidance path, controlling, by the controller, the vehicle not to perform the steering avoidance control and controlling braking of the vehicle.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
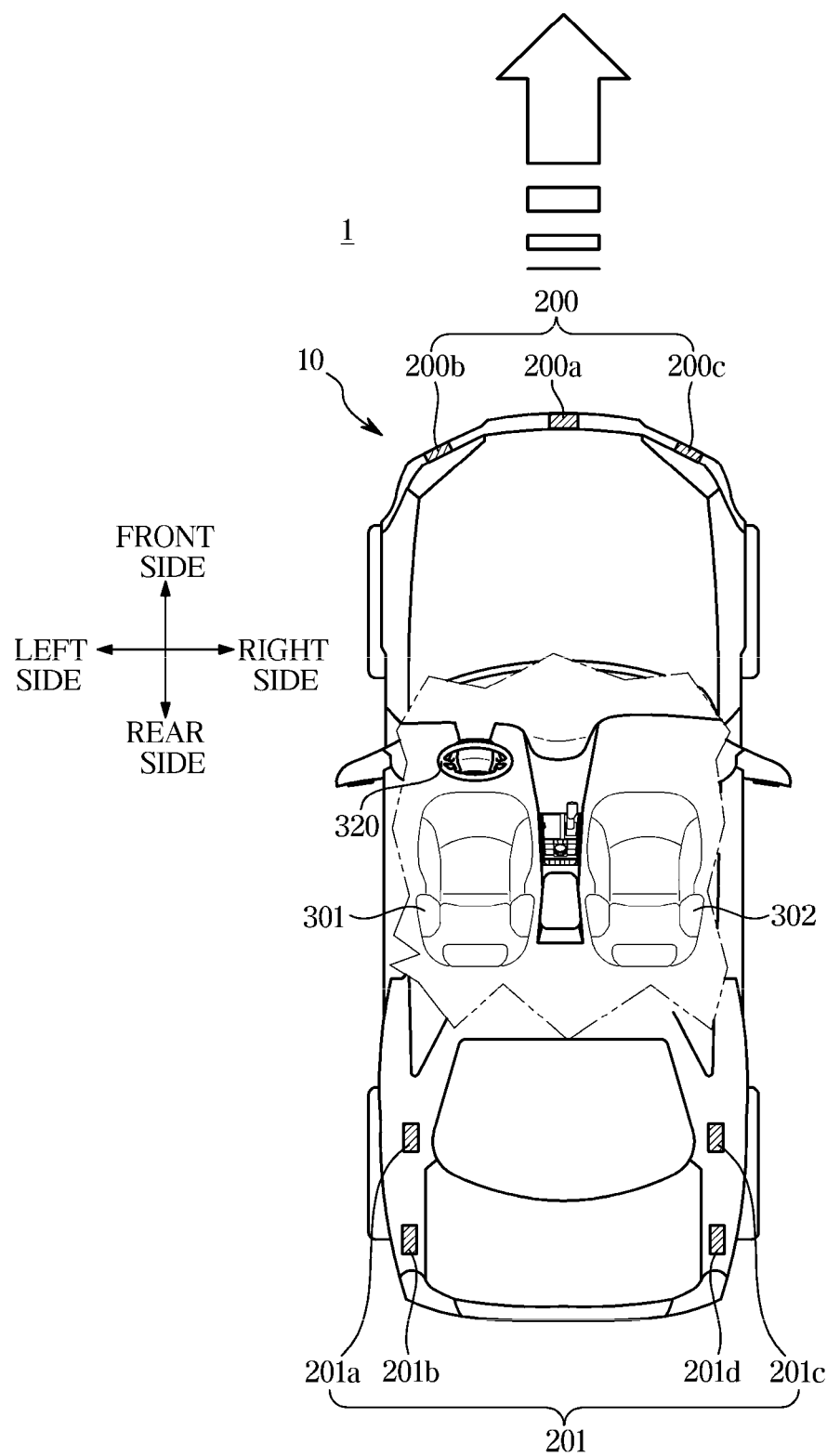
FIG. 1 is a view illustrating a vehicle provided with a sensor and a rear lateral side vehicle detector according to the present disclosure.

Like reference numerals refer to like elements throughout the specification. Not all elements of exemplary embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single part"~," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

When a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms.

These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle and exemplary embodiments of the present disclosure will now be described with reference to the accompanying drawings.

Figure 2:
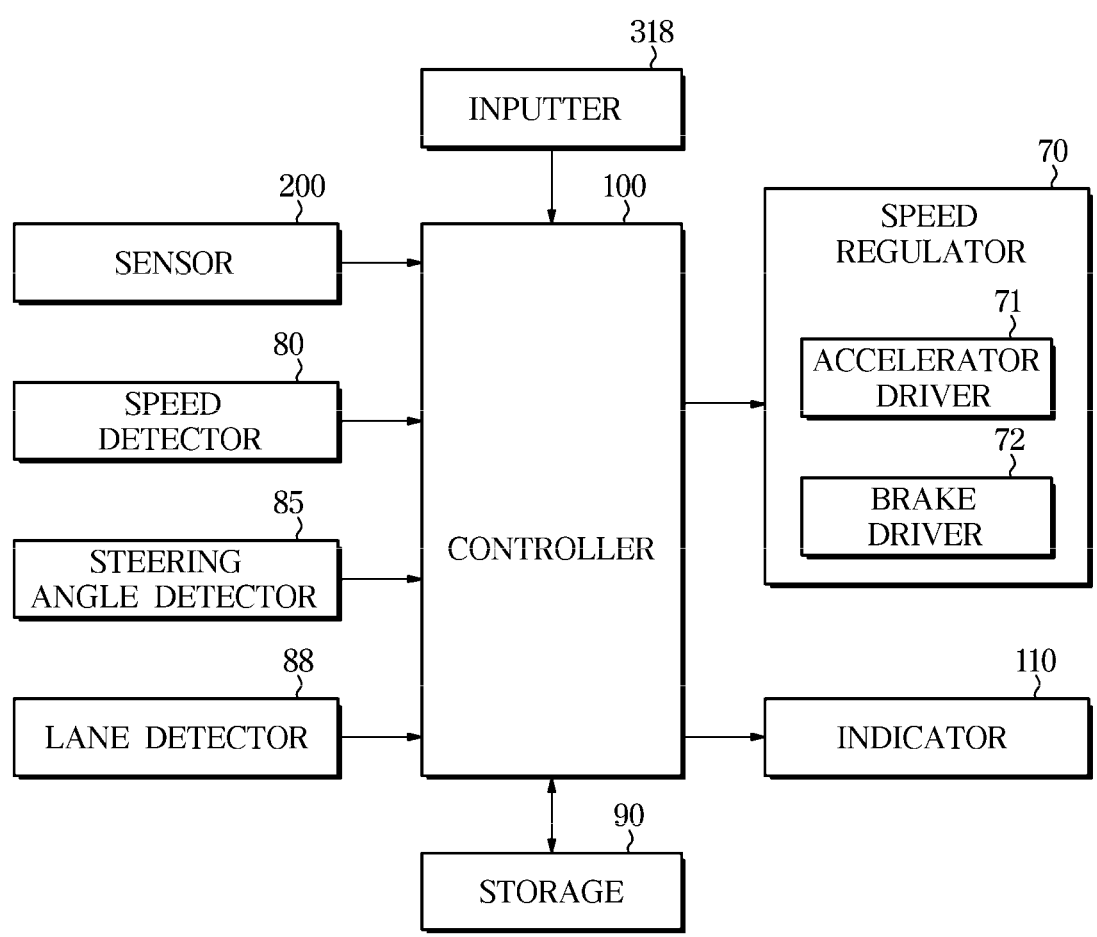
FIG. 2 is a control block diagram of a vehicle according to the present disclosure.
Figure 3A:
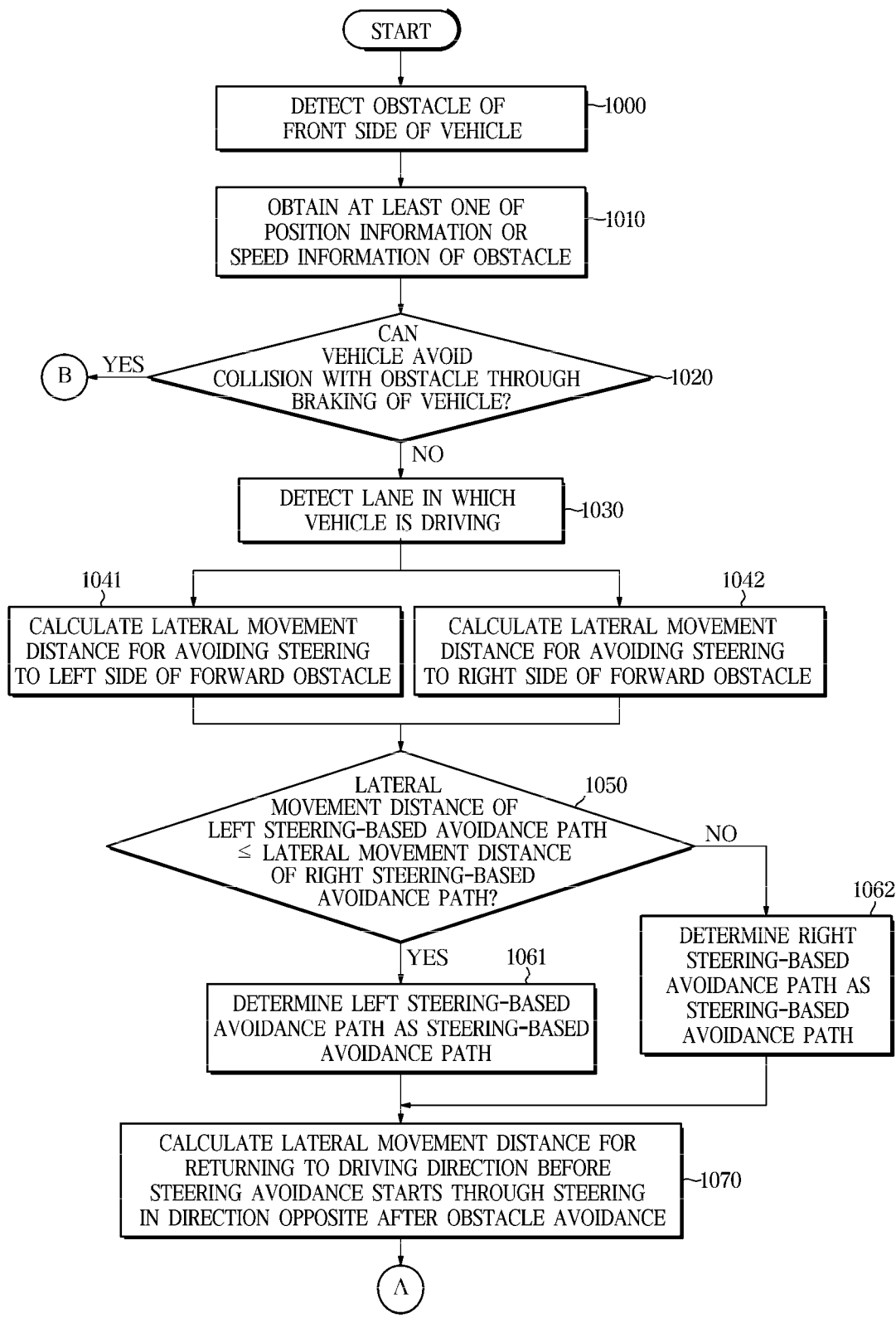
FIGS. 3A and 3B are flowcharts illustrating a method of controlling a vehicle according to the present disclosure.
Figure 3B:
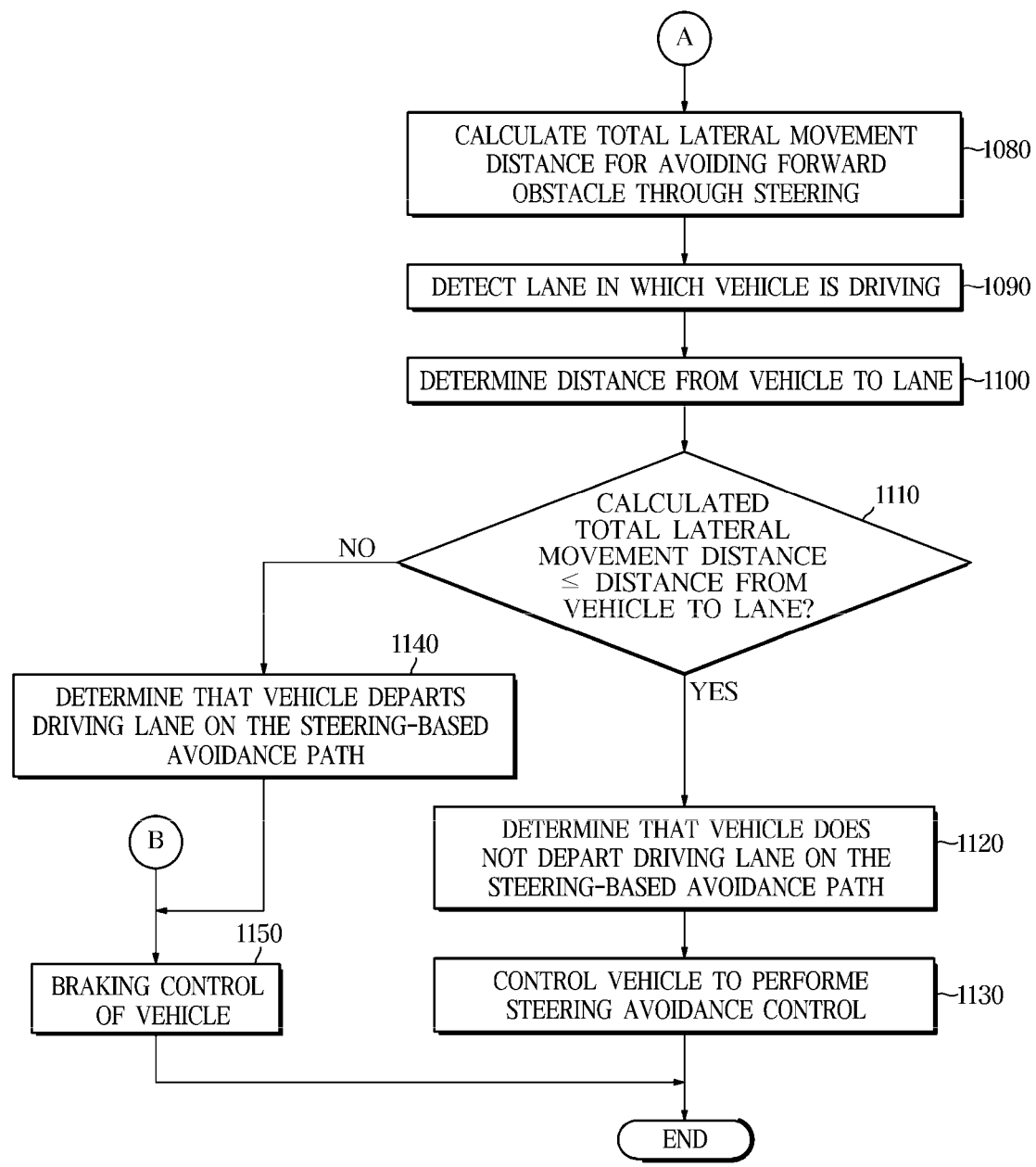
Figure 4:
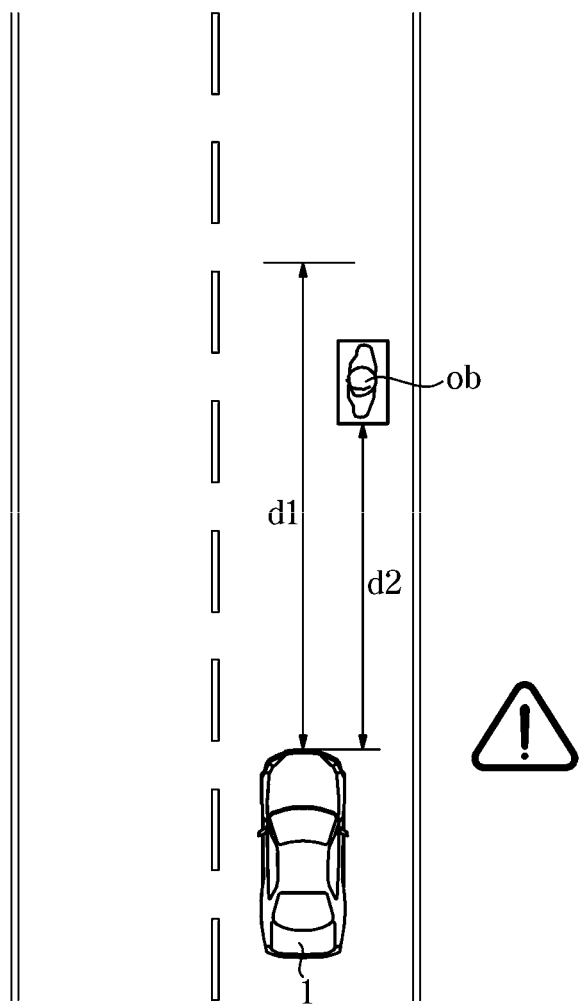
FIG. 4 is a conceptual view of a vehicle avoiding a collision with a forward obstacle through braking according to the present disclosure.
Figure 5:
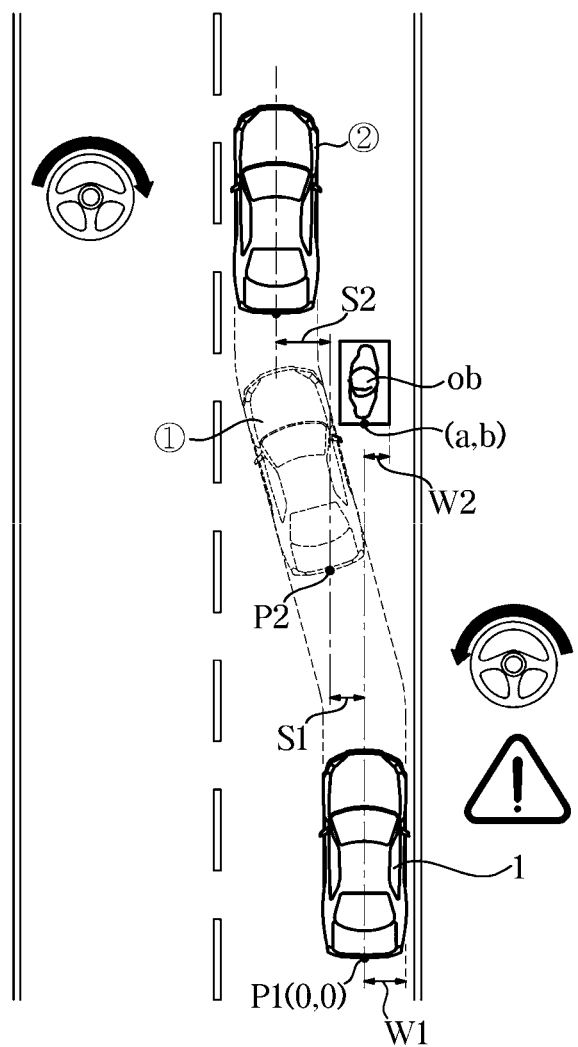
FIG. 5 is a view illustrating a lateral movement distance when a vehicle avoids a collision to a left side of a forward obstacle through steering according to the present disclosure.
Figure 6:
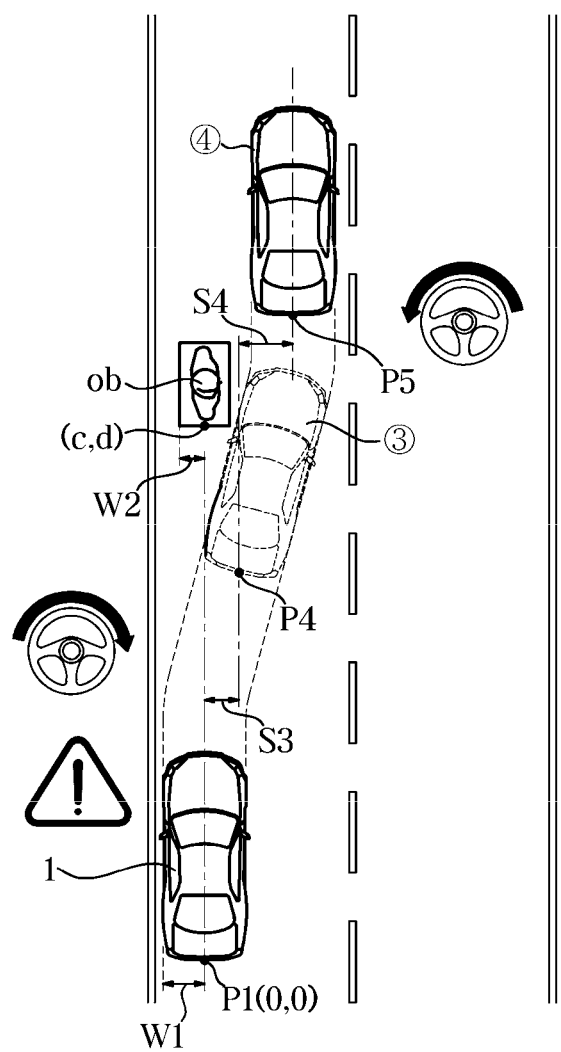
FIG. 6 is a view illustrating a lateral movement distance when a vehicle avoids a collision to a right side of a forward obstacle through steering according to the present disclosure.
Figure 7:
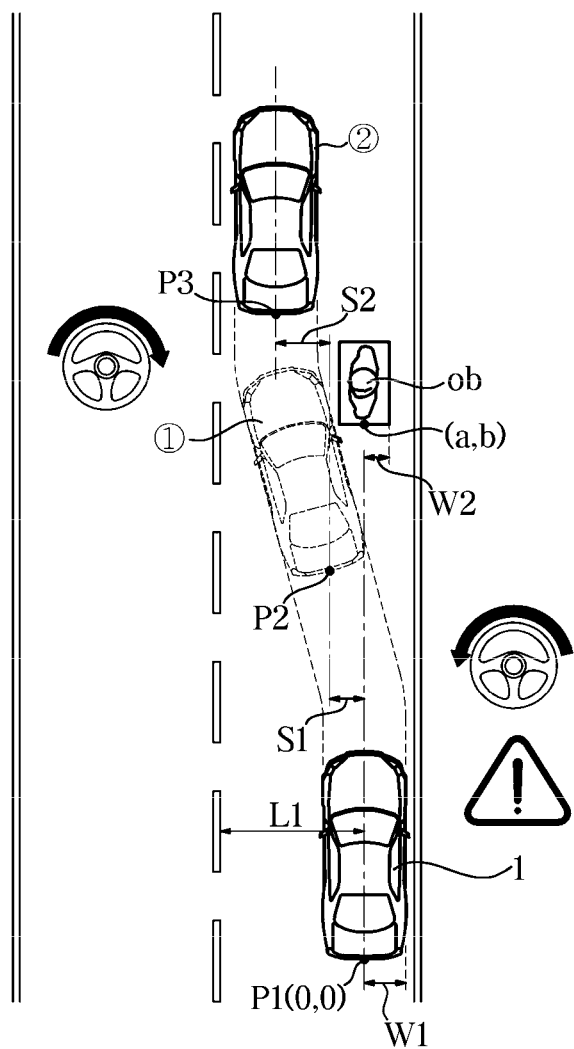
FIG. 7 is a view illustrating that a vehicle does not depart a lane when the vehicle avoids a forward obstacle through steering according to the present disclosure.
Figure 8:
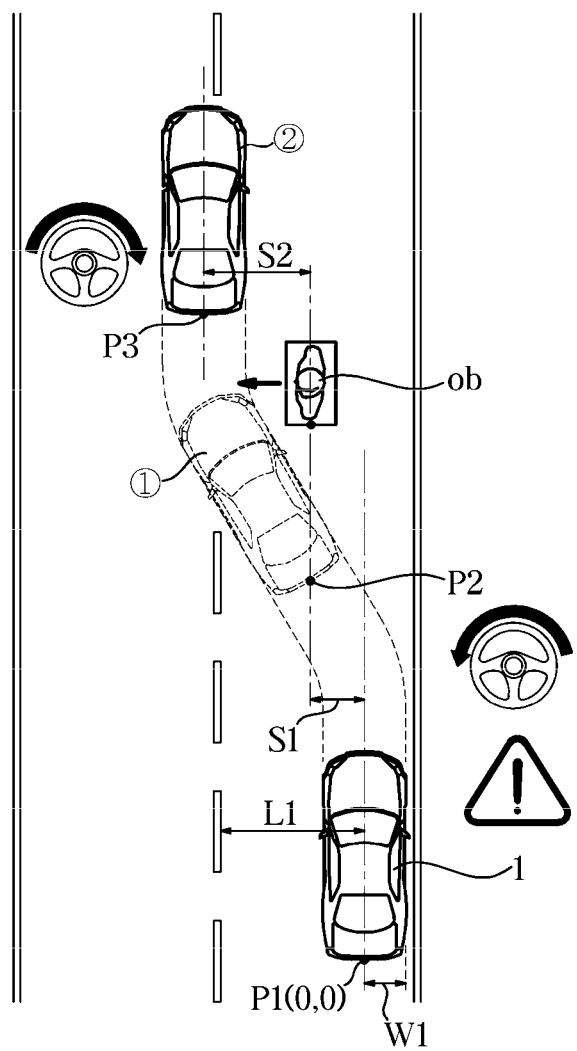
FIG. 8 is a view illustrating that a vehicle departs a lane when the vehicle avoids a forward obstacle through steering according to the present disclosure.

FIG. 1 is a view illustrating a vehicle provided with a sensor and a rear lateral side vehicle detector according to the present disclosure, FIG. 2 is a control block diagram of a vehicle according to the present disclosure, FIGS. 3A and 3B are flowcharts illustrating a method of controlling a vehicle according to the present disclosure, FIG. 4 is a conceptual view of a vehicle avoiding a collision with a forward obstacle through braking according to the present disclosure, FIG. 5 is a view illustrating a lateral movement distance when a vehicle avoids a collision to a left side of a forward obstacle through steering according to the present disclosure, FIG. 6 is a view illustrating a lateral movement distance when a vehicle avoids a collision to a right side of a forward obstacle through steering according to the present disclosure, FIG. 7 is a view illustrating that a vehicle does not depart a lane when the vehicle avoids a forward obstacle through steering according to the present disclosure, and FIG. 8 is a view illustrating that a vehicle departs a lane when the vehicle avoids a forward obstacle through steering according to the present disclosure.

Hereinafter, for convenience of description, a direction in which a vehicle 1 drives forward may be defined as the front side, and the left direction and the right direction may be defined with respect to the front side. When the front side is a 12 o'clock direction, a 3 o'clock direction or in the vicinity of the 3 o'clock direction may be defined as the right direction and a 9 o'clock direction or in the vicinity of the 9 o'clock direction may be defined as the left direction. A direction opposite to the front side may be defined as the rear side. A bottom direction with respect to the vehicle 1 may be defined as the lower side and a direction opposite to the lower side may be defined as the upper side. Additionally, a surface disposed on the front side may be defined as a front surface, a surface disposed on the rear side may be defined as a rear surface, and a surface disposed on the lateral side may be defined as a side surface. Furthermore, a side surface in the left direction may be defined as a left surface and a side surface in the right direction may be defined as a right surface.

Referring to FIG. 1, a sensor 200 may be disposed within the vehicle 1. The sensor 200 may detect an object (obstacle) located in the front side of the vehicle 1 and obtain at least one of position information and driving speed information of the detected object.

The sensor 200 may obtain at least one of the position information and the driving speed information of the object located around of the vehicle 1 based on the vehicle 1. In other words, the sensor 200 may obtain coordinate information, which changes as the object moves, in real time and detect a distance between the vehicle 1 and the object.

As will be described later, a controller 100 (see FIG. 2) may calculate a relative distance and a relative speed between the vehicle 1 and the object based on the position and speed information of the object obtained by the sensor 200, and thus the controller 100 may calculate a time to collision (TTC) between the vehicle 1 and the object based on the calculated relative distance and relative speed.

As illustrated in FIG. 1, the sensor 200 may be installed in a position that is appropriate to detect an object, e.g. other vehicle, in the front, lateral or front lateral side. According to an exemplary embodiment, the sensor 200 may be installed at the front, the left and the right side of the vehicle 1 to detect the object in the front side of the vehicle 1, a direction between the left side and the front side (hereinafter, referred to as "front left side") of the vehicle 1 and a direction between the right side and the front side (hereinafter, referred to as "front right side") of the vehicle 1.

For example, a first sensor 200a may be installed as a part of a radiator grill 6, e.g., inside of the radiator grill 6, or alternatively the first sensor 200a may be installed in any position of the vehicle 1 suitable for detecting another vehicle located in the front side of the vehicle 1. However, according to an exemplary embodiment, it will be described that the first sensor 200a is installed in the center of the front surface of the vehicle 1. A second sensor 200b may be installed in the left side of the vehicle 1, and a third sensor 200c may be installed in the right side of the vehicle 1.

The sensor 200 may include a rear lateral side sensor 201 configured to detect a pedestrian or other vehicle that is present in or approaching from the rear side, lateral side or a direction between the lateral side and the rear side (hereinafter referred to as a "rear lateral side") of the vehicle 1. As illustrated in FIG. 1, the rear lateral side sensor 201 may be installed in a position that is appropriate to detect the object, e.g. other vehicle, on the lateral side, rear side or rear lateral side.

The rear lateral side sensor 201 may be installed on both the left side and the right side of the vehicle 1 so that the object can be detected from both a direction (hereinafter, referred to as "rear left side") between the left side and the rear of the vehicle 1 and a direction (hereinafter, referred to as "rear right side") between the right side and the rear of the vehicle 1. For example, the a rear lateral side sensor 201a or a second rear lateral side sensor 201b may be provided on the left side of the vehicle 1, and a third rear lateral side sensor 201c or a fourth rear lateral side sensor 201d may be provided on the right side of the vehicle 1.

The sensor 200 may be implemented using a variety of devices, e.g., a radar using millimeter waves or microwaves, Light Detection And Ranging (LiDAR) using pulsed laser light, a vision sensor using visible light, an infrared sensor using infrared light, or an ultrasonic sensor using ultrasonic waves. The sensor 200 may be implemented using any one of the radar, the Light Detection And Ranging (LiDAR), the vision sensor, the infrared sensor, or the ultrasonic sensor or by combining them. When a plurality of the sensors 200 is disposed within the vehicle 1, each of the sensors 200 may be implemented by using the same type of sensor or different type of sensor. The implementation of the sensor 200 is not limited thereto, and the sensor 200 may be implemented using a variety of devices and a combination thereof which is considered by a designer.

Referring to FIG. 2, the vehicle 1 may include, a speed regulator 70 for regulating a driving speed of the vehicle 1 driven by a driver, a speed detector 80 for detecting the driving speed of the vehicle 1, a steering angle detector 85 for detecting a rotation angle of a steering wheel, a lane detector 88 for detecting a shape of a lane or a road on which the vehicle 1 is driving, a storage 90 for storing data related to the operation of the vehicle 1, the controller 100 for operating each component of the vehicle 1 and controlling the driving speed of the vehicle 1, an indicator 110 for transmitting information to the driver in relation to the operation and driving of the vehicle 1, and an inputter 318 for receiving a command related to the operation of the vehicle 1.

In particular, the speed regulator 70 may regulate the speed of the vehicle 1 driven by the driver. The speed regulator 70 may include an accelerator driver 71 and a brake driver 72.

The accelerator driver 71 may increase the speed of the vehicle 1 by operating the accelerator in response to the control signal of the controller 100. The brake driver 72 may reduce the speed of the vehicle 1 by operating the brake in response to the control signal of the controller 100.

The speed regulator 70 may regulate the driving speed of the vehicle 1 under the control of the controller 100. When the risk of collision between the vehicle 1 and another object is high, the speed regulator 70 may decrease the driving speed of the vehicle 1.

The speed detector 80 may detect the driving speed of the vehicle 1 driven by the driver under the control of the controller 100. In other words, the speed detector 80 may detect the driving speed by using a rotation speed of the vehicle wheel, wherein the driving speed may be expressed as [kph], and a distance (km) traveled per unit time (h).

The steering angle detector 85 may detect a steering angle that is the rotation angle of the steering wheel while the vehicle 1 is driving. In other words, when the forward obstacle is avoided through steering while the vehicle 1 is driving, the controller 10 may control the steering of the vehicle 1 based on the steering angle detected by the steering angle detector 85.

The lane detector 88 may be implemented as a video sensor such as a camera, and may be mounted in the front side of the vehicle 1. The lane detector 88 may capture surrounding conditions in a direction in which the vehicle 1 drives and transmit it to the controller 100. The captured image obtained from the lane detector 88 may include information about how far the vehicle 1 is from the lane, information about how much the lane or the road is curved, and how far the driving direction of the vehicle 1 departs from the lane, and the like.

The lane detector 88 may obtain information about the distance to the lane, a curvature of a driving road, and a lane departure angle, and transmit the information to the controller 100.

The storage 90 may store various data related to the control of the vehicle 1. Particularly, according to an exemplary embodiment, the storage 90 may store information related to the driving speed, a driving distance, and a driving time of the vehicle 1. Further, the storage 90 may store the position information and the speed information of the object detected by the sensor 200 and the rear lateral side sensor 201. The storage 90 may store coordinates information of the moving object changed in real time. The storage 90 may store information related to the relative distance and the relative speed between the vehicle 1 and the object. In addition, the storage 90 may store data related to equations and control algorithms for operating the vehicle 1, and the controller 100 may transmit a control signal for operating the vehicle 1 in accordance with the equations and control algorithm.

The storage 90 may also store information regarding a steering-based avoidance path established for the vehicle 1 to avoid a collision with the object located in the front side of the vehicle 1 and information regarding the rotation angle of the steering wheel obtained by the steering angle detector 85.

The storage 90 may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory; a volatile memory element, e.g., a Random Access Memory (RAM); or a storage medium, e.g., a Hard Disk Drive (HDD) and a CD-ROM. The implementation of the storage is not limited thereto. The storage 90 may be a memory that is implemented by a separate memory chip from the aforementioned processor related to the controller 100 or the storage may be implemented by a single chip with a processor.

The controller 100 may be a computer, processor, central processing unit, an electronic control unit, etc.

Referring to FIGS. 3A and 3B, while the vehicle 1 is driving, the sensor 200 may detect an obstacle ob of a front side of the vehicle 1 (1000) and obtain at least one of the position information or the speed information of the obstacle ob (1010).

Hereinafter, a case where the obstacle ob is a pedestrian walking in the front side of the vehicle 1 will be described as an example.

The controller 100 may determine the possibility of collision avoidance between the vehicle 1 and the obstacle ob, according to the TTC calculated based on the relative distance and the relative speed of the vehicle 1 and the obstacle ob.

In other words, the controller 100 may control the speed regulator 70 to perform braking control of the vehicle 1 (1150) to avoid collision with the obstacle ob.

As the driving speed of the vehicle 1 is faster, the braking distance that can avoid collision with the obstacle ob through the braking control may not be sufficiently secured. In other words, the controller 100 may determine whether the vehicle 1 can avoid collision with the obstacle ob through the braking control based on a current driving speed of the vehicle 1 and the distance to the obstacle ob. (1020).

As illustrated in FIG. 4, as a result of the determination of the controller 100, the braking distance required for the driving vehicle 1 to avoid collision with the obstacle ob is d1, but the distance between the current vehicle 1 and the obstacle ob is d2 and shorter than d1, the controller 100 may determine that the vehicle 1 cannot avoid collision with the obstacle ob through braking.

In other words, when the vehicle 1 cannot avoid collision with the obstacle ob through braking, the controller 100 may control the vehicle 1 to avoid the obstacle ob through steering. When the vehicle 1 avoids the obstacle ob through steering, when the vehicle 1 departs from a driving lane, there is a risk of secondary accident, such as colliding with another vehicle driving in a side lane.

Therefore, according to the vehicle 1 and a method of controlling the vehicle 1 according to an exemplary embodiment, when the vehicle 1 avoids the forward obstacle ob through steering, the controller 100 may control steering avoidance of the vehicle 1 according to whether lanes depart from the driving lane.

As described above, the lane detector 88 may detect the lane in which the vehicle 1 is driving (1030), and obtain information about the distance between the vehicle 1 and the lane and the curvature of the driving road and transmit the information to the controller 100.

The controller 100 may calculate a lateral movement distance for the vehicle 1 to avoid the forward obstacles ob through steering and determine the steering-based avoidance path for the obstacle ob based on the calculated lateral movement distance.

Referring to FIG. 5, the controller 100 may calculate the lateral movement distance for the vehicle 1 to avoid steering to the left side of the obstacle ob based on the position information of the obstacle ob, width information of the vehicle 1, and width information of the obstacle ob (1041). The controller 100 may calculate the lateral movement distance for the vehicle 1 to avoid to a right of the obstacle ob (1042).

As illustrated in FIG. 5, when position coordinate of the center of the vehicle 1 is P1 (0, 0) and position coordinate of the center of the obstacle ob is P2 (a, b), a half-length of the width of the vehicle 1 may be W1 and a half-length of the width of the obstacle ob may be W2.

In order for the vehicle 1 to perform steering avoidance to the left with respect to the obstacle ob, it is necessary to turn the steering wheel to the left side to perform leftward steering avoidance.

When the vehicle 1 performs leftward steering avoidance on the obstacle ob, the controller 100 may calculate the lateral movement distance required for steering avoidance of the vehicle 1. The lateral movement distance required for steering avoidance may be calculated by as a sum of the half-length W1 of the width of the vehicle 1 and the half-length W2 of the width of the obstacle ob based on lateral position coordinate of the obstacle ob.

In other words, when the vehicle 1 reaches position ① by steering to the left side to avoid the obstacle ob, the obstacle ob may be avoided. In this case, the lateral movement distance for the vehicle 1 to ovoid steering the obstacle ob is S1. In other words, S1 is the lateral movement distance required for the vehicle 1 to avoid the collision by steering the forward obstacle ob to the left side and is the distance between the position coordinate P1 of the center of the vehicle 1 before steering avoidance and the position coordinate P2 of the center of the vehicle 1 after steering avoidance.

As described above, the controller 100 may determine the lateral movement distance and the steering-based avoidance path for the vehicle 1 that is driving to avoid steering the obstacle ob to the left side, based on the position information of the obstacle ob, the width information of the vehicle 1, and the width information of the obstacle ob.

Referring to FIG. 6, when the position coordinate of the center of the vehicle 1 is P1 (0, 0) and the position coordinate of the center of the obstacle ob is P2 (a, b) as illustrated in FIG. 5, the half-length of the width of the vehicle 1 may be W1 and the half-length of the width of the obstacle ob may be W2.

In order for the vehicle 1 to perform steering avoidance to the right side with respect to the obstacle ob, it is necessary to turn the steering wheel to the right side to perform rightward steering avoidance.

When the vehicle 1 performs rightward steering avoidance on the obstacle ob, the controller 100 may calculate the lateral movement distance required for steering avoidance of the vehicle 1. The lateral movement distance required for steering avoidance may be calculated by as a sum of the half-length W1 of the width of the vehicle 1 and the half-length W2 of the width of the obstacle ob based on lateral position coordinate of the obstacle ob.

In other words, when the vehicle 1 reaches a position ③ by steering to the right side to avoid the obstacle ob, the obstacle ob may be avoided. In this case, the lateral movement distance for the vehicle 1 to avoid steering the obstacle ob is S3. In other words, S3 is the lateral movement distance required for the vehicle 1 to avoid the collision by steering the forward obstacle ob to the right side and is the distance between the position coordinate P1 of the center of the vehicle 1 before steering avoidance and the position coordinate P4 of the center of the vehicle 1 after steering avoidance.

In FIG. 5 and FIG. 6, the position coordinates of the obstacle ob are the same as (a, b), but the required lateral movement distance as the vehicle 1 performs steering avoidance to the left side or the right side is opposite in sign when the half-length W1 of the width of the vehicle 1 and the half-length W2 of the width of the obstacle ob based on lateral position coordinate of the obstacle ob are summed together.

As described above, the controller 100 may determine the lateral movement distance and the steering-based avoidance path for the vehicle 1 that is driving to avoid steering the obstacle ob to the right side, based on the position information of the obstacle ob, the width information of the vehicle 1, and the width information of the obstacle ob.

The controller 100 may compare the lengths of the lateral movement distance S1 of a left steering-based avoidance path and the lateral movement distance S3 of a right steering-based avoidance path determined by the above-described method (1050). As a result of the comparison, the controller 100 may determine a path having a short lateral movement distance among the left steering-based avoidance path and the right steering-based avoidance path as the steering-based avoidance path for the obstacle ob.

This is because steering in a shorter lateral movement distance is more advantageous for obstacle avoidance.

In other words, when the lateral movement distance S1 of the left steering-based avoidance path calculated by the controller 100 is shorter than the lateral movement distance S3 of the right steering-based avoidance path, the controller 100 may determine the left steering-based avoidance path as the steering-based avoidance path for the obstacle ob of the vehicle (1061).

On the other hand, when the lateral movement distance S3 of the right steering-based avoidance path calculated by the controller 100 is shorter than the lateral movement distance S1 of the left steering-based avoidance path, the controller 100 may determine the right steering-based avoidance path as the steering-based avoidance path for the obstacle ob of the vehicle (1062).

After the vehicle 1 avoids the forward obstacle ob through steering, the controller 100 may calculate the lateral movement distance for the vehicle 1 to return to the driving direction before the steering avoidance starts through steering in a direction opposite to a steering direction for obstacle avoidance (1070).

Referring again to FIG. 5, the vehicle 1 may continue to drive in the driving direction before the steering avoidance starts by steering the obstacle ob to the left side to reach position ① and then reaching position ② through the steering in the opposite direction.

In other words, the controller 100 may calculate the lateral movement distance S2 for the vehicle 1 to return to the driving direction before the steering avoidance starts, based on the position coordinate P3 of the center of the vehicle 1 when the vehicle 1 reaches ② position.

Similarly, referring to FIG. 6, the vehicle 1 may continue to drive in the driving direction before the steering avoidance starts by steering the obstacle ob to the right side to reach position ③ and then reaching position ④ through the steering in the opposite direction.

In other words, the controller 100 may calculate the lateral movement distance S4 for the vehicle 1 to return to the driving direction before the steering avoidance starts, based on the position coordinate P5 of the center of the vehicle 1 when the vehicle 1 reaches ④ position.

Hereinafter, for convenience of description, a case in which the steering-based avoidance path of the vehicle 1 for avoiding the obstacle ob is determined as the left steering-based avoidance path will be described as an example.

The controller 100 may calculate a total lateral movement distance for the vehicle 1 to avoid the forward obstacle ob through steering by summing the lateral movement distance S1 for the vehicle 1 to avoid steering the forward obstacle ob and the lateral movement distance S2 for the vehicle 1 to return to the driving direction after the steering avoidance starts before steering avoidance starts (1080).

In other words, the controller 100 may calculate the total lateral movement distance required for the vehicle 1 to return to an original driving path after steering of the forward obstacle ob.

As described above, the lane detector 88 may detect the lane in which the vehicle 1 is driving in real time (1090).

The controller 100 may determine a distance L1 from the vehicle 1 to the lane based on lane information detected by the lane detector 88 (1100), and may compare the total lateral movement distance necessary for the steering avoidance of the vehicle 1 calculated previously with the distance L1 from the vehicle 1 to the lane to determine whether the vehicle 1 departs from the lane on the steering-based avoidance path of the vehicle 1 (1110).

Referring to FIG. 7, when the total lateral movement distance S1+S2 required for the vehicle 1 to return to the original driving path after steering avoidance of the obstacle ob is shorter than the distance L1 from the vehicle 1 to the lane, the controller 100 may determine that the vehicle 1 does not depart the driving lane on the steering-based avoidance path of the vehicle 1 (1120).

In this case, the controller 100 may determine that the vehicle 1 may perform collision avoidance without departing the driving lane while performing the steering avoidance on the obstacle ob.

Accordingly, when it is determined that the vehicle 1 does not depart the driving lane on the steering-based avoidance path of the vehicle 1 as illustrated in FIG. 7, the controller 100 may control the vehicle 1 to avoid collision with the forward obstacle ob by performing steering avoidance control (1130).

On the other hand, referring to FIG. 8, when the total lateral movement distance S1+S2 required for the vehicle 1 to return to the original driving path after steering avoidance of the obstacle ob is longer than the distance L1 from the vehicle 1 to the lane, the controller 100 may determine that the vehicle 1 depart the driving lane on the steering-based avoidance path of the vehicle 1 (1140).

In this case, the controller 100 may avoid the collision with the obstacle ob by performing the steering avoidance on the obstacle ob, but may determine that there is a risk of secondary collision with another vehicle driving in a side lane by departing the driving lane.

Accordingly, when it is determined that the vehicle 1 departs the driving lane on the steering-based avoidance path of the vehicle 1 as illustrated in FIG. 8, the controller 100 may control the vehicle 1 no to perform the steering avoidance control.

In other words, as the result of the determination of the controller 100, when the vehicle 1 performs steering avoidance to avoid collision with the obstacle ob, the controller 100 may prevent the steering avoidance control itself on the obstacle ob and control only the braking of the vehicle 1 in case where there is the risk of secondary collision by departing the driving lane (1150).

According to the vehicle and the method of controlling the vehicle according to the exemplary embodiments, in a situation in which the braking distance for collision avoidance control is shortened through Forward Collision Avoidance (FCA) while the vehicle is driving, it is possible to avoid the collision with the obstacle through the steering avoidance and to maintain the lane without departing the lane in which the vehicle is driving.

The disclosed exemplary embodiments may be implemented in the form of a recording medium storing instructions that are executable by a computer. The instructions may be stored in the form of a program code, and when executed by a processor, the instructions may generate a program module to perform operations of the disclosed exemplary embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the present disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A vehicle comprising:
   a sensor configured to detect an obstacle of a front side of the vehicle to obtain at least one of position information or speed information of the obstacle;
   a lane detector configured to detect a lane on which the vehicle is located; and
   a controller configured to:
   calculate a first lateral movement distance for the vehicle to avoid the obstacle through steering,
   determine a steering-based avoidance path for the obstacle based on the first lateral movement distance,
   calculate a second lateral movement distance for the vehicle to return to an original driving direction after the vehicle avoids the obstacle through steering avoidance based on the steering-based avoidance path, wherein the original driving direction is a driving direction of the vehicle before the vehicle starts the steering avoidance,
   calculate a total lateral movement distance based on the first lateral movement distance and the second lateral movement distance,
   determine a distance from the vehicle to the lane based on lane information detected by the lane detector,
   determine whether the vehicle is expected to depart the lane on the steering-based avoidance path by comparing the total lateral movement distance with the distance from the vehicle to the lane, and
   control the vehicle to perform steering avoidance control when it is determined that the vehicle is not expected to depart the lane on the steering-based avoidance path.

2. The vehicle according to claim 1, wherein the controller is configured to calculate a left steering-based avoidance path to avoid steering to a left side of the obstacle and a right steering-based avoidance path to avoid steering to a right side of the obstacle, based on the position information of the obstacle, width information of the vehicle, and width information of the obstacle.

3. The vehicle according to claim 2, wherein the controller is configured to determine a path having a shorter distance among the left steering-based avoidance path and the right steering-based avoidance path as the steering-based avoidance path for the obstacle.

4. The vehicle according to claim 1, wherein, when the total lateral movement distance is shorter than the distance from the vehicle to the lane, the controller determines that the vehicle is not expected to depart the lane on the steering-based avoidance path.

5. The vehicle according to claim 1, wherein, when the total lateral movement distance is longer than the distance from the vehicle to the lane, the controller determines that the vehicle is expected to depart the lane on the steering-based avoidance path.

6. The vehicle according to claim 1, wherein, when it is determined that the vehicle is expected to depart the lane on the steering-based avoidance path, the controller is configured such that the controller controls the vehicle not to perform the steering avoidance control and to control braking of the vehicle.

7. A method of controlling a vehicle, the method comprising:
   detecting, by a sensor, an obstacle of a front side of the vehicle to obtain at least one of position information or speed information of the obstacle;
   calculating, by a controller, a first lateral movement distance for the vehicle to avoid an obstacle through steering;
   determining, by the controller, a steering-based avoidance path for the obstacle based on the first lateral movement distance;
   calculating, by the controller, a second lateral movement distance for the vehicle to return to an original driving direction after the vehicle avoids the obstacle through steering avoidance based on the steering-based avoidance path, wherein the original driving direction is a driving direction of the vehicle before the vehicle starts the steering avoidance;
   calculating, by the controller, a total lateral movement distance based on the first lateral movement distance and the second lateral movement distance;
   detecting, by a lane detector, a lane on which the vehicle is located;
   determining, by the controller, a distance from the vehicle to the lane based on lane information detected by the lane detector;
   determining, by the controller, whether the vehicle is expected to depart the lane on the determined steering-based avoidance path by comparing the total lateral movement distance with the distance from the vehicle to the lane; and
   controlling, by the controller, the vehicle to perform steering avoidance control when it is determined that the vehicle is not expected to depart the lane on the steering-based avoidance path.

8. The method according to claim 7, wherein the calculating a first lateral movement distance comprises calculating a left steering-based avoidance path to avoid steering to a left side of the obstacle and a right steering-based avoidance path to avoid steering to a right side of the obstacle, based on the position information of the obstacle, width information of the vehicle, and width information of the obstacle.

9. The method according to claim 8, wherein the determining a steering-based avoidance path comprises determining a path having a shorter distance among the left steering-based avoidance path and the right steering-based avoidance path as the steering-based avoidance path for the obstacle.

10. The method according to claim 7, wherein the determining whether the vehicle is expected to depart the lane comprises, when the total lateral movement distance is shorter than the distance from the vehicle to the lane, determining that the vehicle is not expected to depart the lane on the steering-based avoidance path.

11. The method according to claim 7, wherein the determining whether the vehicle is expected to depart the lane comprises, when the total lateral movement distance is longer than the distance from the vehicle to the lane, determining that the vehicle the vehicle is expected to depart the lane on the steering-based avoidance path.

12. The method according to claim 7, further comprising, when it is determined that the vehicle is expected to depart the lane on the steering-based avoidance path, controlling, by the controller, the vehicle not to perform the steering avoidance control and controlling braking of the vehicle.

* * * * *